United States Patent
Chen et al.

(10) Patent No.: US 10,602,170 B2
(45) Date of Patent: Mar. 24, 2020

(54) SIGNAL EXTENSION METHOD AND SYSTEM

(71) Applicant: LONTIUM SEMICONDUCTOR CORPORATION, Hefei Anhui (CN)

(72) Inventors: Feng Chen, Hefei Anhui (CN); Jin Su, Hefei Anhui (CN); Zhen Wang, Hefei Anhui (CN); Rongliang Yu, Shenzhen Guangdong (CN); Wenhan Yin, Shenzhen Guangdong (CN)

(73) Assignee: LONTIUM SEMICONDUCTOR CORPORATION, Hefei Anhui (CN)

( * ) Notice: Subject to any disclaimer, the term of this patent is extended or adjusted under 35 U.S.C. 154(b) by 0 days.

(21) Appl. No.: 16/032,600

(22) Filed: Jul. 11, 2018

(65) Prior Publication Data

US 2019/0028724 A1    Jan. 24, 2019

(30) Foreign Application Priority Data

Jul. 24, 2017  (CN) .......................... 2017 1 0607011
Jul. 24, 2017  (CN) ..................... 2017 2 0903746 U
Nov. 24, 2017  (TW) .............................. 106140889 A

(51) Int. Cl.
  *H04N 19/42*    (2014.01)
  *H04N 19/44*    (2014.01)
  (Continued)

(52) U.S. Cl.
  CPC ............. *H04N 19/42* (2014.11); *H04N 5/765* (2013.01); *H04N 7/10* (2013.01); *H04N 7/108* (2013.01);
  (Continued)

(58) Field of Classification Search
  CPC .................................................. H04N 19/85
  (Continued)

(56) References Cited

U.S. PATENT DOCUMENTS

2015/0288919 A1* 10/2015 Labosco ................ H04N 19/44
                                                    348/445

FOREIGN PATENT DOCUMENTS

CN    101094358 A    12/2007
CN    103108136 A    5/2013
(Continued)

OTHER PUBLICATIONS

Summary of the Taiwanese First Office Action corresponding to Application No. 106140889; dated Jun. 11, 2018.
(Continued)

*Primary Examiner* — Dominic D Saltarelli
(74) *Attorney, Agent, or Firm* — Cantor Colburn LLP

(57) ABSTRACT

A signal extension system is provided according to the present disclosure, which includes: a transmitting side chip and a receiving side chip connected to the transmitting side chip. The transmitting side chip is configured to receive high-definition video data and transmit the high-definition video data to the receiving side chip after performing first color space conversion, low compression, parallel-serial coding on the high-definition video data sequentially. The receiving side chip is configured to receive the high-definition video data transmitted from the transmitting side chip and output the high-definition video data to a display device for display after performing serial-parallel decoding, low decompression, and second color space conversion on the received high-definition video data. With the above signal extension system, a transmission distance of the high-definition video data is extended.

9 Claims, 5 Drawing Sheets

(51) Int. Cl.
  *H04N 5/76*   (2006.01)
  *H04N 7/10*   (2006.01)
  *H04N 9/64*   (2006.01)
  *H04N 9/67*   (2006.01)
  *H04N 5/765*  (2006.01)
(52) U.S. Cl.
  CPC ................. *H04N 9/64* (2013.01); *H04N 9/67* (2013.01); *H04N 19/44* (2014.11); *H04N 5/76* (2013.01)
(58) Field of Classification Search
  USPC ............................................ 375/240, 240.01
  See application file for complete search history.

(56) References Cited

FOREIGN PATENT DOCUMENTS

| | | |
|---|---|---|
| CN | 106973243 A | 7/2017 |
| TW | 201349857 A | 12/2013 |

OTHER PUBLICATIONS

Taiwanese Second Office Action corresponding to Application No. 106140889; dated Nov. 6, 2018.

* cited by examiner

SIGNAL EXTENSION METHOD AND SYSTEM

CROSS REFERENCE TO RELATED APPLICATION

The present application claims priority under 35 U.S.C. § 119 to Chinese Patent Application No. 201710607011.X, filed on Jul. 24, 2017, Chinese Patent Application No. 201720903746.2, filed on Jul. 24, 2017, and Taiwan Patent Application No. 106140889, filed on Nov. 24, 2017, the entire content of which is incorporated herein by reference.

FIELD

The present disclosure relates to the technical field of signal transmission, and in particular to a signal extension method and a signal extension system.

BACKGROUND

Technologies of high-definition media interface (HDMI) or high definition displayport (DP) has advantages of non-compression lossless high resolution display characteristics and real-time performance to bring high quality audio-visual experience to users. A HDMI or DP based keyboard, video, mouse (KVM) system is a common comprehensive system that provides users with controllable high-definition video display services.

The high-definition images without compression require a high data rate, which limits the application of this technology. Since a high-definition signal is attenuated exponentially in a cable, a high-definition HDMI or DP signal, especially a high-definition 4k or 8k signal, can only be transmitted a few meters away even with an expensive wire, thus greatly limiting applications of non-compression lossless high-definition display based on the HDMI or DP.

Due to the limitation of transmission distance of high-definition data, a KVM system can only provide the high-definition video display services in a small range. Therefore, an effective signal extension circuit system is required to extend a transmission distance of a high-definition signal.

SUMMARY

Due to the defects of the conventional technology, a signal extension method and a signal extension system are provided according to the present disclosure, which can extend a transmission distance of a high-definition signal.

A signal extension system includes: a transmitting side chip and a receiving side chip connected to the transmitting side chip. The transmitting side chip is configured to receive high-definition video data and transmit the high-definition video data to the receiving side chip after performing first color space conversion, low compression, parallel-serial coding on the high-definition video data sequentially. The receiving side chip is configured to receive the high-definition video data transmitted from the transmitting side chip and output the high-definition video data to a display device for display after performing serial-parallel decoding, low decompression, second color space conversion on the received high-definition video data.

The transmitting side chip includes: a data receiving module, a protocol logic module, a first color space conversion module, a low compression module, a universal serializer and deserializer (SERDES) coding parallel/serial conversion module and a data transmitting module. The data receiving module is configured to receive a high-definition video data packet. The protocol logic module is connected to the data receiving module, and configured to perform protocol unpacking on the high-definition video data packet received by the data receiving module to obtain the high-definition video data. The first color space conversion module is connected to the protocol logic module, and configured to perform the first color space conversion on the high-definition video data transmitted from the protocol logic module. The low compression module is connected to the first color space conversion module, and configured to perform the low compression on high-definition video data subjected to the first color space conversion and transmitted from the first color space conversion module. The universal SERDES coding and parallel-serial conversion module is connected to the low compression module, and configured to perform coding and parallel-serial conversion on the compressed high-definition video data transmitted from the low compression module. The data transmitting module is connected to the universal SERDES coding and parallel-serial conversion module, and configured to transmit serial high-definition video data transmitted from the universal SERDES coding and parallel-serial conversion module to the receiving side chip.

The receiving side chip includes: a signal receiving module, a universal SERDES decoding and serial-parallel conversion module, a data decompression module, a second color conversion module, a protocol packing module and a signal transmitting module. The signal receiving module is configured to receive the high-definition video data transmitted from the transmitting side chip. The universal SERDES decoding and serial-parallel conversion module is connected to the signal receiving module, and configured to perform decoding and serial-parallel conversion on the high-definition video data received by the signal receiving module. The data decompression module is connected to the universal SERDES decoding and serial-parallel conversion module, and configured to perform decompression on the high-definition video data transmitted from the universal SERDES decoding and serial-parallel conversion module. The second color space conversion module is connected to the data decompression module, and configured to perform the second color space conversion on the high-definition video data transmitted from the data decompression module. The protocol packing module is connected to the second color space conversion module, and configured to perform protocol packing on the high-definition video data subjected to the second color space conversion and transmitted from the second color space conversion module to obtain a high-definition video data packet. The signal transmitting module is connected to the protocol packing module, and configured to transmit the high-definition video data packet transmitted from the protocol packing module to the display device for display.

The system further includes: two bidirectional universal serial bus (USB) signal extension chips connected to each other, configured to transmit a USB signal and a control signal.

The two bidirectional USB signal extension chips are connected to each other via a pair of differential lines.

The transmitting side chip and the receiving side chip are connected via a pair of differential lines.

The transmitting side chip and the receiving side chip are connected via three or less pairs of differential lines.

The transmitting side chip is an application specific integrated circuit (ASIC) chip or a field programmable gate array (FPGA) chip; and the receiving side chip is an ASIC chip or an FPGA chip.

A signal extension method applied to a data transmitting side includes following steps. High-definition video data is received. First color space conversion, low compression, coding and parallel-serial conversion are performed on the high-definition video data sequentially. The processed high-definition video data is transmitted to a data receiving side, so that the data receiving side processes the high-definition video data and transmits the high-definition video data to a display device for display.

The method further includes: receiving a control signal and transmitting the control signal to the data receiving side.

A signal extension method applied to the data receiving side, includes following steps. High-definition video data transmitted from a data transmitting side is received, where the high-definition video data is high-definition video data subjected to first color space conversion, low compression, coding and parallel-serial conversion performed by the data transmitting side. Decoding, serial-parallel conversion, decompression and second color space conversion are performed on the high-definition video data sequentially. The processed high-definition video data is transmitted to a display device, so that the display device displays the high-definition video data.

The method further includes following steps. A control signal transmitted from the data transmitting side is received and the control signal is transmitted to the display device, so that the display device controls a display process of the high-definition video data based on the control signal.

The signal extension system provided according to the present disclosure mainly includes two receiving/transmitting chips connected to each other. A chip is used for transmitting a high-definition video data signal to another chip after performing the first color space conversion, low compression and parallel-serial coding on the high-definition video data. The other chip outputs the high-definition video data signal to a display device for display after receiving the high-definition video data signal and performing the serial-parallel decoding, low decompression, second color space conversion on the high-definition video data. The above first color space conversion and the low compression may reduce a data bandwidth without affecting video image quality, thereby extending a transmission distance of the high-definition video data.

BRIEF DESCRIPTION OF THE DRAWINGS

In order to more clearly illustrate technical solutions of the embodiments of the present disclosure or the conventional technology, the drawings required in the description of the embodiments or the conventional technology are briefly described below. Apparently, the drawings show only some embodiments of the present disclosure, and other drawings may be acquired by those skilled in the art based on the drawings provided herein without any creative work.

DETAILED DESCRIPTION

The technical solutions according to the embodiments of the present disclosure will be described clearly and completely hereinafter in conjunction with the drawings in the embodiments of the present disclosure. Apparently, the described embodiments are only a part rather than all of embodiments of the present disclosure. Any other embodiments acquired by those skilled in the art based on the embodiments of the present disclosure without any creative work fall in the protection scope of the present disclosure.

Figure 1:
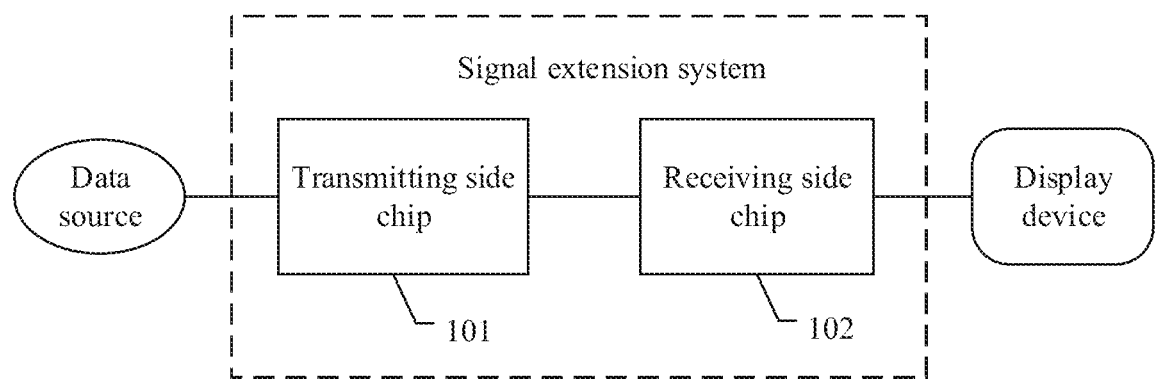
FIG. 1 is a schematic structural diagram of a signal extension system according to an embodiment of the present disclosure.

A signal extension system is provided in the embodiment of the present disclosure. As shown in FIG. 1, the system includes: a transmitting side chip 101 and a receiving side chip 102 connected to the transmitting side chip 101.

The transmitting side chip 101 and the receiving side chip 102 are mainly used for processing signals and transmitting or receiving signals. The transmitting side chip 101 and the receiving side chip 102 are arranged on different positions, and are connected by a data connection line for signal transmission.

The transmitting side chip 101 is configured to receive high-definition video data and transmit the high-definition video data to the receiving side chip 102 after performing first color space conversion, low compression and parallel-serial coding on the high-definition video data sequentially.

In the embodiment, the high-definition video data received by the transmitting side chip 101 is a high-definition video data packet received through a HDMI port or a DP port. A protocol parsing process is performed on the high-definition video data packet to obtain the high-definition video data.

The first color space conversion may reduce a color depth of the high-definition video data so as to reduce a data rate of the high-definition video data. The low compression may achieve a code stream compression ratio up to 8:1 without affecting image quality, thereby reducing a bandwidth required for code stream transmission.

The parallel-serial coding refers to a process of coding the high-definition video data and performing parallel-serial conversion to convert parallel data into serial data.

Finally, the transmitting side chip 101 transmits the processed serial high-definition video data to the receiving side chip 102.

The receiving side chip 102 is configured to receive the high-definition video data transmitted from the transmitting side chip 101 and output the high-definition video data to a display device for display after performing serial-parallel decoding, low decompression and second color space conversion on the received high-definition video data sequentially.

The transmitting side and the receiving side of the signal extension system are in a symmetrical architecture. That is, the structure of the receiving side chip 102 is symmetrical to the structure of the transmitting side chip 101. Corresponding to the transmitting side chip 101 performing the first color space conversion, low compression, coding and parallel-serial conversion, the receiving side chip 102 performs the serial-parallel conversion, decoding, decompression and second color space conversion on the high-definition video data transmitted from the transmitting side chip 101 to convert the color space of the high-definition video data to an original color space, thereby achieving a recovery of the received high-definition video data.

Finally, the receiving side chip 102 outputs recovered high-definition video data to the display device for display. The high-definition video data recovered by the receiving side chip 102 is the same as the high-definition video data received by the transmitting side chip 101.

The signal extension system provided in the embodiment of the present disclosure mainly includes two receiving/transmitting chips connected to each other. A chip is used for transmitting high-definition video data to the other chip after performing the first color space conversion, low compression and parallel-serial coding on the high-definition video data. The other chip outputs the high-definition video data signal to a display device for display after receiving the high-definition video data signal and performing the serial-parallel decoding, low decompression, second color space conversion on the high-definition video data. The first color space conversion and the low compression may reduce a data bandwidth without affecting video image quality, thereby extending a transmission distance of the high-definition video data.

Figure 2:
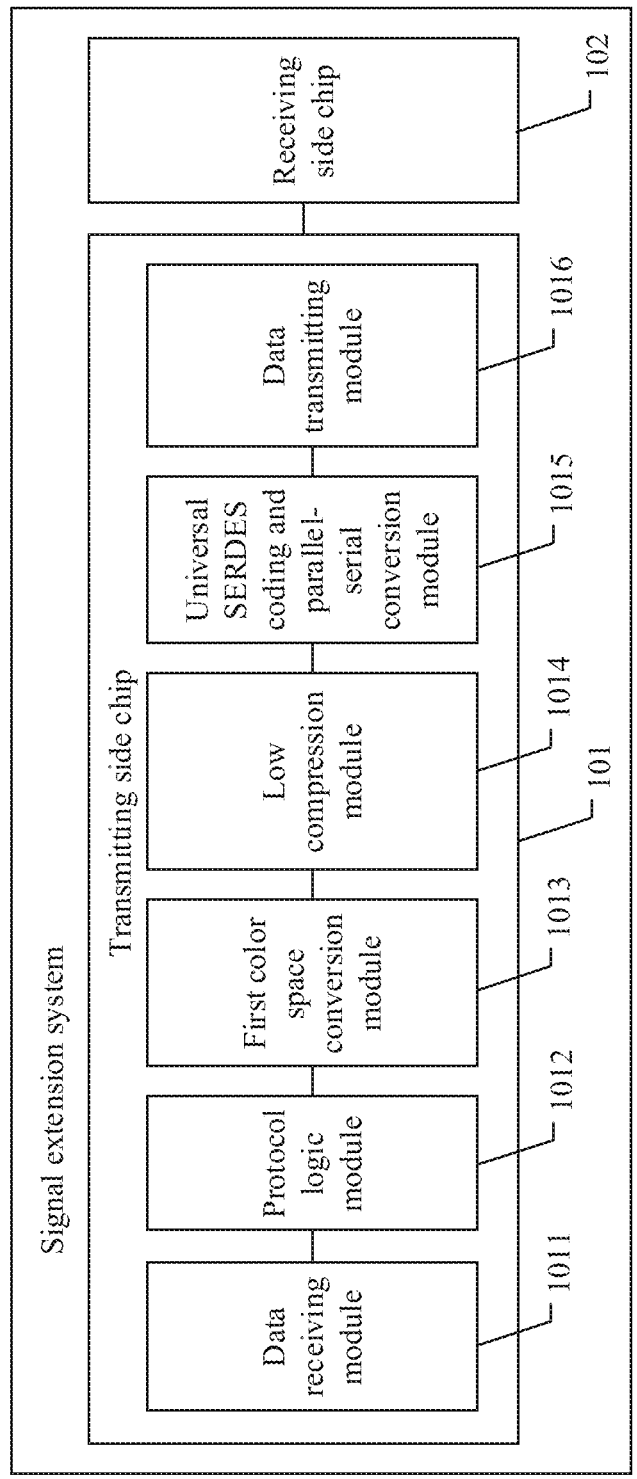
FIG. 2 is a schematic structural diagram of a signal extension system according to another embodiment of the present disclosure.

In another embodiment of the present disclosure, as shown in FIG. 2, the transmitting side chip 101 includes: a data receiving module 1011, a protocol logic module 1012, a first color space conversion module 1013, a low compression module 1014, a universal SERDES coding and parallel-serial conversion module 1015 and a data transmitting module 1016.

The data receiving module 1011 is configured to receive a high-definition video data packet.

In an embodiment, the data receiving module 1011 includes a data receiving circuit connected to a HDMI port or a DP port to receive the high-definition video data packet outputted from the HDMI port or the DP port.

The protocol logic module 1012 is connected to the data receiving module 1011 and is configured to perform protocol unpacking on the high-definition video data packet received by the data receiving module 1011 to obtain the high-definition video data.

After receiving the high-definition video data packet, the data receiving module 1011 transmits the high-definition video data packet to the protocol logic module 1012. The protocol logic module 1012 unpacking the received high-definition video data packet according to a specified protocol, to obtain the high-definition video data included in the data packet.

The first color space conversion module 1013 is connected to the protocol logic module 1012 and is configured to perform the first color space conversion on the high-definition video data transmitted by the protocol logic module 1012.

The protocol logic module 1012 transmits the unpacked high-definition video data to the first color space conversion module 1013. The first color space conversion module 1013 performs conversion on a color space of the high-definition video data. In implementing the technical scheme of the present disclosure, an engineer may determine whether a color space conversion of 4:4:4→4:2:2 or 4:4:4→4:2:0 is to be adopted based on a resolution requirement, a wire quality and a wire length of the display device and a signal format supported by the signal source of the transmitting side. The color depth of the high-definition video data can be reduced by the color space conversion, thereby reducing the data bandwidth.

It should be noted that, based on an actual use demand, the first color space conversion may not be performed on the high-definition video data. In this case, the first color space conversion module 1013 may be removed from the transmitting side chip 101 or may be controlled not to work.

The low compression module 1014 is connected to the first color space conversion module 1013 and is configured to perform low compression on the high-definition video data subjected to the first color space conversion and transmitted from the first color space conversion module 1013.

The first color space conversion module 1013 transmits the high-definition video data to the low compression module 1014 after performing the first color space conversion on the high-definition video data. The low compression module 1014 performs low compression on the high-definition video data. In practices, based on a data transmission demand, a compression ratio may be set as 1, 2, 3 or 4, to further reduce the bandwidth of a video code stream while ensuring a high image quality.

It should be noted that, based on actual demands on data transmission rate and distance, the step of compressing the high-definition video data may be omitted, that is, the low compression module 1014 may be omitted.

The universal SERDES coding and parallel-serial conversion module 1015 is connected to the low compression module 1014 and is configured to perform coding and parallel-serial conversion on compressed high-definition video data transmitted from the low compression module 1014.

The low compression module 1014 transmits the low compressed high-definition video data to the universal SERDES coding and parallel-serial conversion module 1015. The universal SERDES coding and parallel-serial conversion module 1015 performs the coding and the parallel-serial conversion on the low compressed high-definition video data to convert the high-definition video data to coded serial data.

The data transmitting module 1016 is connected to the universal SERDES coding and parallel-serial conversion module 1015 and is configured to transmit the serial high-definition video data transmitted from the universal SERDES coding and parallel-serial conversion module to the receiving side chip 102.

The universal SERDES coding and parallel-serial conversion module 1015 transmits the serial high-definition video data to the data transmitting module 1016, so that the data transmitting module 1016 transmits the serial high-definition video data to the receiving side chip 102.

Figure 3:
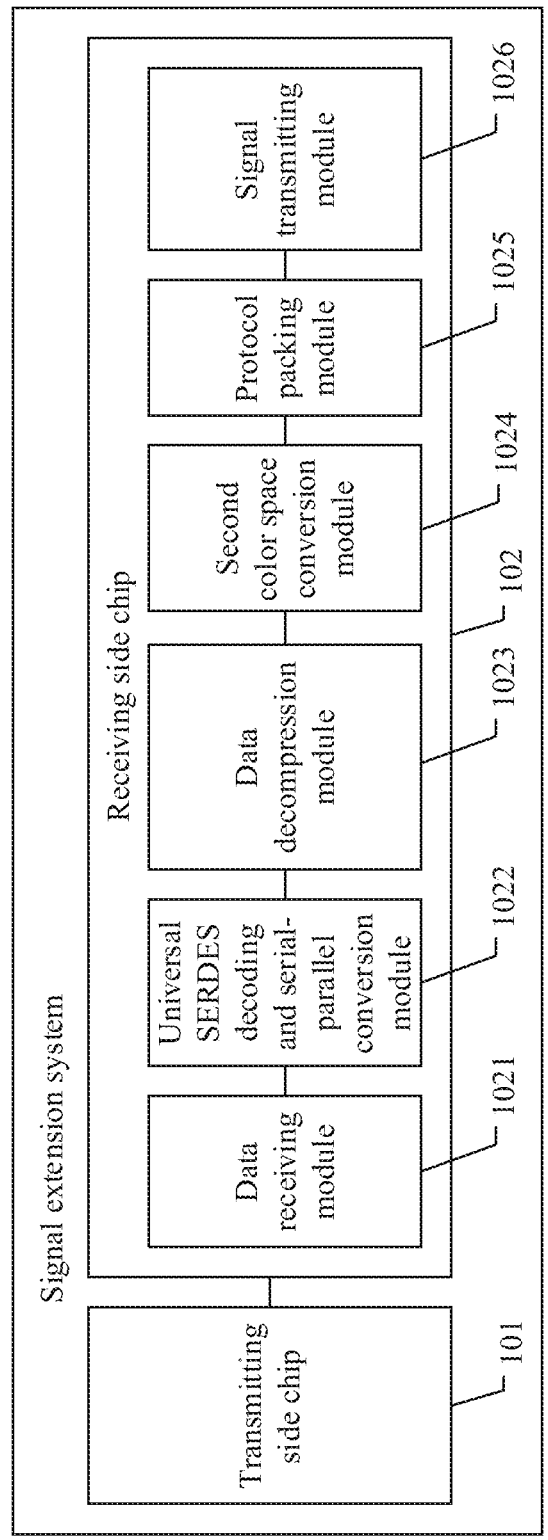
FIG. 3 is a schematic structural diagram of a signal extension system according to another embodiment of the present disclosure.

In another embodiment of the present disclosure, as shown in FIG. 3, the receiving side chip 102 includes: a signal receiving module 1021, a universal SERDES decoding and serial-parallel conversion module 1022, a data decompression module 1023, a second color space conversion module 1024, a protocol packing module 1025 and a signal transmitting module 1026.

The signal receiving module 1021 is configured to receive the high-definition video data transmitted from the transmitting side chip 101.

The universal SERDES decoding and serial-parallel conversion module 1022 is connected to the signal receiving module 1021 and is configured to perform decoding and serial-parallel conversion on the high-definition video data received by the signal receiving module 1021.

The data decompression module 1023 is connected to the universal SERDES decoding and serial-parallel conversion module 1022 and is configured to perform decompression on the high-definition video data transmitted from the universal SERDES decoding and serial-parallel conversion module 1022.

The second color space conversion module 1024 is connected to the data decompression module 1023 and is configured to perform the second color space conversion on the high-definition video data transmitted from the data decompression module 1023.

The protocol packing module 1025 is connected to the second color space conversion module 1024 and is configured to perform protocol packing on the high-definition video data subjected to the second color space conversion and transmitted from the second color space conversion module 1024 to obtain the high-definition video data packet.

The signal transmitting module 1026 is connected to the protocol packing module 1025 and is configured to transmit the high-definition video data packet transmitted from the protocol packing module 1025 to a display device for display.

The structure of the receiving side chip 102 is symmetrical to the structure of the transmitting side chip 101. Processes performed in the signal receiving module 1021, the universal SERDES decoding and serial-parallel conversion module 1022, the data decompression module 1023, the second color space conversion module 1024, the protocol packing module 1025 and the signal transmitting module 1026 in the receiving side chip 102 respectively corresponds to the processes of the modules in the transmitting side chip 101.

It should be noted that, a decompression ratio of the decompression performed by the data decompression module 1023 and a mechanism of the color space conversion performed by the second color space conversion module 1024 in the receiving side chip 102 should be respectively the same as the compression ratio of the low compression and the mechanism of the first color space conversion performed in the transmitting side chip, such that the receiving side chip 102 can correctly recover the high-definition video data.

Figure 4:
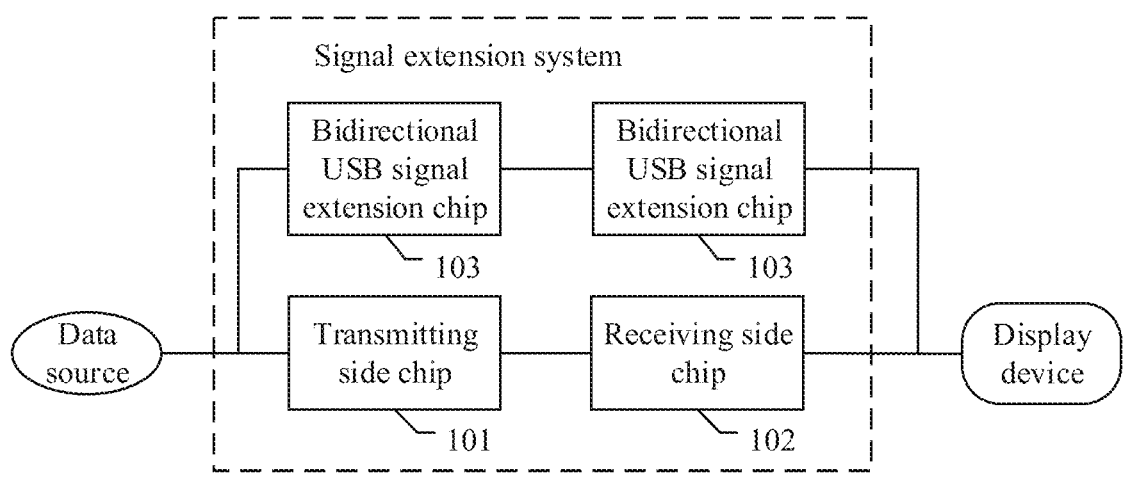
FIG. 4 is a schematic structural diagram of a signal extension system according to another embodiment of the present disclosure.

In another embodiment of the present disclosure, as shown in FIG. 4, the system further includes: two bidirectional USB signal extension chips 103 connected to each other and configured to transmit a control signal.

The above bidirectional USB signal extension chip 103 is an improved bidirectional USB2.0 extender ASIC chip, specifically used for extending a USB signal and other control signals such as a specially processed DDC/AUX signal.

In a KVM system, the display device is controlled by a keyboard and a mouse to display the video. Therefore, in the embodiment of the present disclosure, a pair of bidirectional USB signal extension chips 103 is used for achieving extended transmission of the control signal. In this way, display of high-definition video can be controlled in the KVM system.

In another embodiment of the present disclosure, the two bidirectional USB signal extension chips 103 are connected to each other via a pair of differential lines.

The pair of differential lines, which connect the two bidirectional USB signal extension chips to each other, may be an ordinary CAT cable, such as a CAT5e cable and a CAT6 cable.

In another embodiment of the present disclosure, the transmitting side chip 101 and the receiving side chip 102 are connected to each other via a pair of differential lines.

The pair of differential lines, which connect the transmitting side chip 101 and the receiving side chip 102 to each other, may be an ordinary CAT cable, such as a CAT5e cable and a CAT6 cable.

In another embodiment of the present disclosure, the transmitting side chip 101 and the receiving side chip 102 are connected to each other via three or less pairs of differential lines.

In the embodiment of the present disclosure, the three pair of differential lines, which connect the transmitting side chip 101 and the receiving side chip 102 to each other, may be three or less pairs of differential lines in a CAT cable. In this way, another pair of differential lines in the CAT cable may be used for transmitting a control signal. Therefore, only one CAT cable is required to construct the KVM system with the signal extension system according to the embodiment, which is quite convenient.

In another embodiment of the present disclosure, the transmitting side chip 101 or the receiving side chip 102 may be an application specific Integrated circuit (ASIC) chip, or a field programmable gate array (FPGA) chip.

Figure 5:
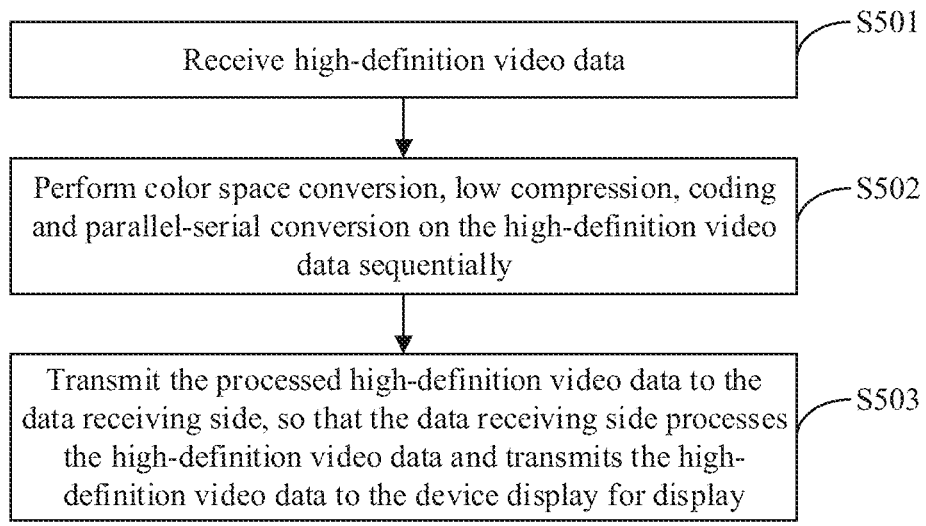
FIG. 5 is a schematic flowchart of a signal extension method according to an embodiment of the present disclosure.

A signal extension method is provided according to an embodiment of the present disclosure, which is applied to a data transmitting side. As shown in FIG. 5, the method includes step S501 to S503.

In step S501, high-definition video data is received.

The data transmitting side receives a high-definition video data packet from a HDMI port or a DP port and performs protocol parsing on the high-definition video data packet, to obtain the high-definition video data.

In step S502, first color space conversion, low compression, coding and parallel-serial conversion are performed on the high-definition video data sequentially.

In implementing the technical scheme of the present disclosure, an engineer may determine whether a color space conversion of 4:4:4→4:2:2 or 4:4:4→4:2:0 is to be adopted based on a resolution requirement, a wire quality and a wire length of the display device and a signal format supported by the signal source of the transmitting side. The color depth of the high-definition video data can be reduced by the first color space conversion, thereby reducing the data bandwidth.

In practices, when performing the low compression on the high-definition video data, based on a data transmission demand, a compression ratio may be set as 1, 2, 3 or 4, to further reduce the bandwidth of the video code stream while ensuring a high image quality.

It should be noted that, when implementing the technical scheme of the embodiment of the present disclosure, whether to perform the first color space conversion and the low compression on the high-definition video data can be determined based on the data transmission demand.

After performing the first color space conversion and the low compression on the high-definition video data, the coding and the parallel-serial conversion are performed to convert the high-definition video data to coded serial data.

In step S503, the processed high-definition video data is transmitted to the data receiving side, so that the data receiving side processes the high-definition video data and transmits the high-definition video data to the display device for display.

In an embodiment, the data transmitting side transmits the high-definition video data processed by step S502 to the data receiving side through three or less pairs of differential lines.

The above three or less pairs of differential lines may be three or less pairs of differential lines in a CAT cable.

With the signal extension method provided in the embodiment of the present disclosure, the first color space conversion and the low compression are performed on the high-definition video data at the data transmitting side to reduce the bandwidth of high-definition video data while ensuring the image quality. Then the processed high-definition video data is recovered at the data receiving side to obtain original high-definition video data. In this way, a transmission distance of the high-definition video data is extended.

In another embodiment of the present disclosure, the method further includes a step of receiving a control signal and transmitting the control signal to the data receiving side.

In the embodiment of the present disclosure, transmission of the control signal is also achieved. The transmission process of the control signal is similar to the transmission process of the high-definition video data. The USB signal extension chip of the data transmitting side receives the control signal and transmits the control signal to the USB signal extension chip of the data receiving side through a pair of differential lines to achieve the extended transmission of the control signal.

Figure 6:
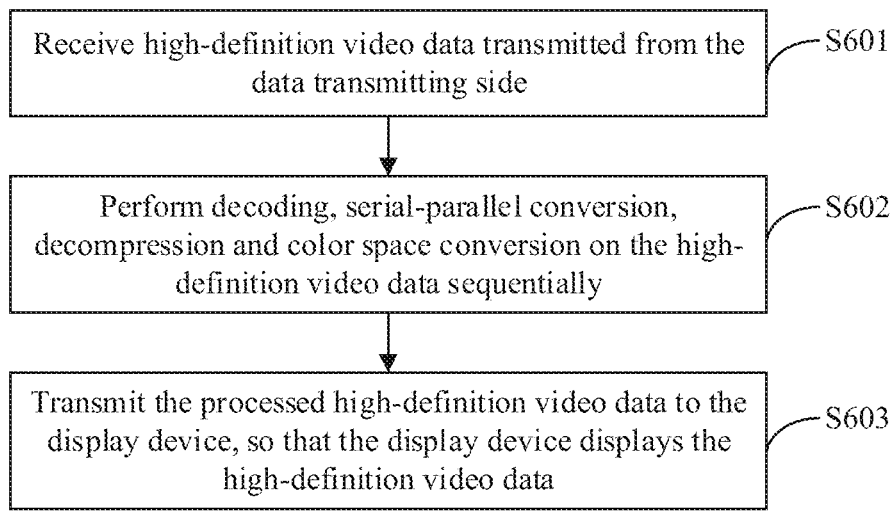
FIG. 6 is a schematic flowchart of a signal extension method according to another embodiment of the present disclosure

Another signal extension method is provided in the embodiment of the present disclosure, which is applied to the data receiving side. As shown in FIG. 6, the method includes the following steps S601 to S603.

In step S601, high-definition video data transmitted from the data transmitting side is received, where the high-definition video data is high-definition video data subjected to the first color space conversion, low compression, coding and parallel-serial conversion performed by the data transmitting side.

In the embodiment of the present disclosure, the data transmitting side firstly receives the high-definition video data then performs the first color space conversion, the low compression, the coding and the parallel-serial conversion on the high-definition video data.

An engineer may determine whether a color space conversion of 4:4:4→4:2:2 or 4:4:4→4:2:0 is to be adopted based on a resolution requirement, a wire quality and a wire length of the display device and a signal format supported by the signal source of the transmitting side. The color depth of the high-definition video data can be reduced by the color space conversion, thereby reducing the data bandwidth.

In practices, for performing the low compression on the high-definition video data, based on the data transmission demand, the compression ratio may be set as 1, 2, 3 or 4, to further reduce the bandwidth of video code stream while ensuring a high image quality.

After performing the first color space conversion and the low compression on the high-definition video data, the coding and the parallel-serial conversion are performed to convert the high-definition video data to coded serial data.

Finally, the data transmitting side transmits processed high-definition video data to the data receiving side.

In step S602, decoding, serial-parallel conversion, decompression and second color space conversion are performed on the high-definition video data sequentially.

After receiving the processed high-definition video data transmitted from the data transmitting side, the data receiving side performs the decoding, serial-parallel conversion, decompression and second color space conversion on the high-definition video data sequentially to recover the high-definition video data to original high-definition video data.

In step S603, the processed high-definition video data is transmitted to the display device, so that the display device displays the high-definition video data.

The data receiving side packs the recovered high-definition video data into a high-definition video data packet and transmits it to the display device, so that the display device displays a high-definition video in the high-definition video data packet.

With the signal extension method provided in the embodiment of the present disclosure, the first color space conversion and the low compression are performed on the high-definition video data at the data transmitting side to reduce the bandwidth of the high-definition video data while ensuring the image quality. Then the processed high-definition video data is recovered at the data receiving side to obtain the original high-definition video data. In this way, a transmission distance of the high-definition video data is extended.

In another embodiment of the present disclosure, the method further includes a step of receiving a control signal transmitted from the data transmitting side and transmitting the control signal to the display device, so that the display device controls a display process of the high-definition video data based on the control signal.

In the embodiment of the present disclosure, transmission of the control signal is also achieved. The transmission process of the control signal is similar to the transmission process of the high-definition video data. The USB signal extension chip of the data transmitting side receives the control signal and transmits the control signal to the USB signal extension chip of the data receiving side through a pair of differential lines to achieve the extended transmission of the control signal.

With reference to the description of the embodiments herein, those skilled in the art can implement or use the technical solution in the present disclosure. Numerous modifications to the embodiments are apparent to those skilled in the art, and the general principles defined herein can be implemented in other embodiments without deviating from the spirit or scope of the present disclosure. Therefore, the scope of the present disclosure is not limited to the embodiments described herein, but is in accordance with the widest scope consistent with the principles and novel features disclosed herein.

The invention claimed is:

1. A signal extension system, comprising:
    a transmitting side chip,
    a receiving side chip connected to the transmitting side chip, and
    two bidirectional universal serial bus (USB) signal extension chips connected to each other, configured to transmit a USB signal and a control signal;
    wherein
    the control signal comprises a DDC signal and/or an AUX signal;
    the transmitting side chip is configured to receive high-definition video data and transmit the high-definition video data to the receiving side chip after performing first color space conversion, low compression, parallel-serial coding on the high-definition video data sequentially; and
    the receiving side chip is configured to receive the high-definition video data transmitted from the transmitting side chip and output the high-definition video data to a display device for display after performing serial-parallel decoding, low decompression, second color space conversion on the received high-definition video data.

2. The system according to claim 1, wherein the transmitting side chip comprises:
- a data receiving module, configured to receive a high-definition video data packet;
- a protocol logic module connected to the data receiving module, configured to perform protocol unpacking on the high-definition video data packet received by the data receiving module to obtain the high-definition video data;
- a first color space conversion module connected to the protocol logic module, configured to perform the first color space conversion on the high-definition video data transmitted from the protocol logic module;
- a low compression module connected to the first color space conversion module, configured to perform the low compression on the high-definition video data subjected to the first color space conversion and transmitted from the first color space conversion module;
- a universal serializer and deserializer (SERDES) coding and parallel-serial conversion module connected to the low compression module, configured to perform coding and parallel-serial conversion on the compressed high-definition video data transmitted from the low compression module; and
- a data transmitting module connected to the universal SERDES coding and parallel-serial conversion module, configured to transmit serial high-definition video data transmitted from the universal SERDES coding and parallel-serial conversion module to the receiving side chip.

3. The system according to claim 1, wherein the receiving side chip comprises:
- a signal receiving module, configured to receive the high-definition video data transmitted from the transmitting side chip;
- a universal serializer and deserializer (SERDES) decoding and serial-parallel conversion module connected to the signal receiving module, configured to perform decoding and serial-parallel conversion on the high-definition video data received by the signal receiving module;
- a data decompression module connected to the universal SERDES decoding and serial-parallel conversion module, configured to perform the low decompression on the high-definition video data transmitted from the universal SERDES decoding and serial-parallel conversion module;
- a second color space conversion module connected to the data decompression module, configured to perform the second color space conversion on the high-definition video data transmitted from the data decompression module;
- a protocol packing module connected to the second color space conversion module, configured to perform protocol packing on the high-definition video data subjected to the second color space conversion and transmitted from the second color space conversion module to obtain a high-definition video data packet; and
- a signal transmitting module connected to the protocol packing module, configured to transmit the high-definition video data packet transmitted from the protocol packing module to the display device for display.

4. The system according to claim 1, wherein the two bidirectional USB signal extension chips are connected to each other via a pair of differential lines.

5. The system according to claim 1, wherein the transmitting side chip and the receiving side chip are connected via a pair of differential lines.

6. The system according to claim 5, wherein the transmitting side chip and the receiving side chip are connected via three or less pairs of differential lines.

7. The system according to claim 1, wherein
the transmitting side chip is an application specific integrated circuit (ASIC) chip or a field programmable gate array (FPGA) chip; and
the receiving side chip is an ASIC chip or an FPGA chip.

8. A signal extension method applied to a data transmitting side, comprising:
- receiving high-definition video data;
- performing first color space conversion, low compression, coding and parallel-serial conversion on the high-definition video data sequentially;
- transmitting the processed high-definition video data to a data receiving side, wherein the data receiving side processes the high-definition video data and transmits the high-definition video data to a display device for display; and
- receiving a control signal and transmitting the control signal, by a first bidirectional USB signal extension chip on the data transmitting side, to a second bidirectional USB signal extension chip on the data receiving side, wherein the first bidirectional USB signal extension chip and the second bidirectional USB signal extension chip are connected with each other, and the control signal comprises DDC signal and/or AUX signal.

9. A signal extension method applied to a data receiving side, comprising:
- receiving high-definition video data transmitted from a data transmitting side, wherein the high-definition video data is high-definition video data subjected to first color space conversion, low compression, coding and parallel-serial conversion performed by the data transmitting side;
- performing decoding, serial-parallel conversion, decompression and second color space conversion on the high-definition video data sequentially;
- transmitting the processed high-definition video data to a display device, wherein the display device displays the high-definition video data;
- receiving a control signal by a second bidirectional USB signal extension chip; and
- transmitting the control signal to the display device, wherein the display device controls a display process of the high-definition video data based on the control signal,
wherein the control signal is transmitted from the data transmitting side by a first bidirectional USB signal extension chip, the first bidirectional USB signal extension chip and the second bidirectional USB signal extension chip are connected with each other, and the control signal comprises DDC signal and/or AUX signal.

\* \* \* \* \*